June 26, 1945.  R. I. N. WEINGART  2,379,053
CASE FOR MEASURING INSTRUMENTS
Filed Dec. 5, 1942
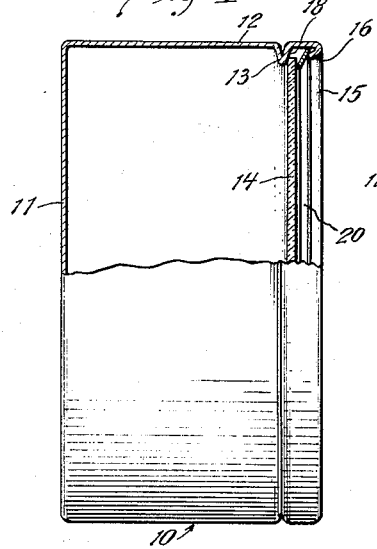
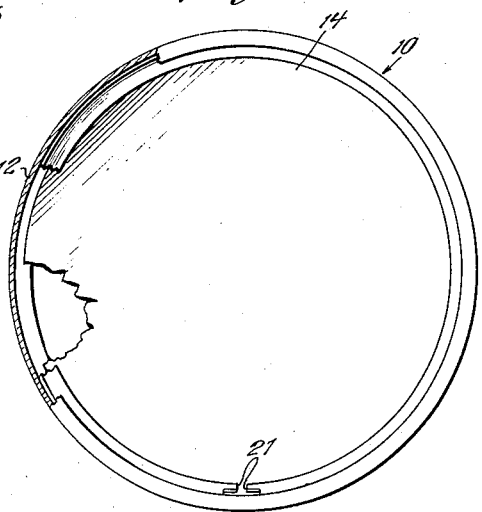
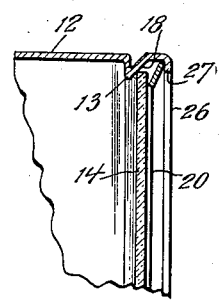
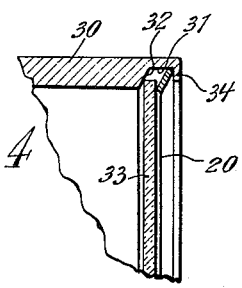
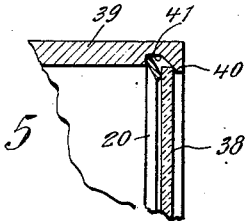
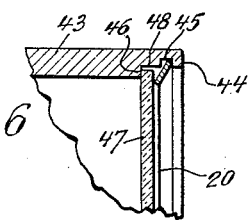
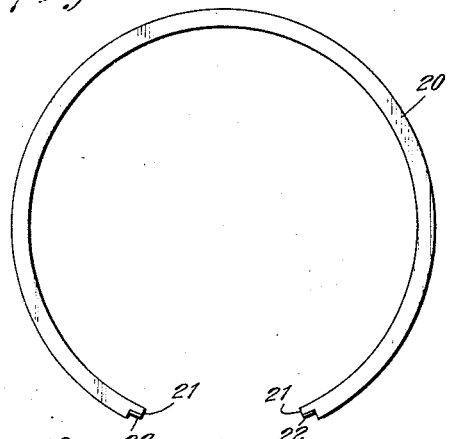
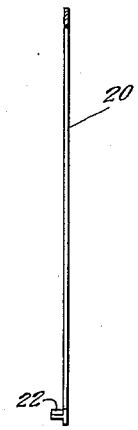
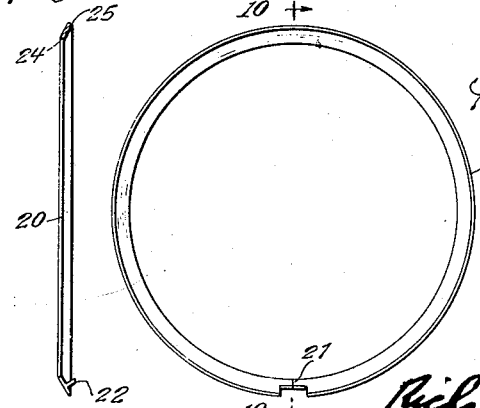
INVENTOR.
Richard I. N. Weingart
BY John P. Chandler
his Attorney

Patented June 26, 1945

2,379,053

UNITED STATES PATENT OFFICE 2,379,053

CASE FOR MEASURING INSTRUMENTS

Richard I. N. Weingart, Glen Head, N. Y.

Application December 5, 1942, Serial No. 468,013

1 Claim. (Cl. 220—82)

This invention relates to new and useful improvements in gauge casings and the like. More generally, the invention relates to new and novel means for mounting an observation plate or face, formed of glass or other transparent material, in a gauge or other measuring or indicating instrument, or in any article or apparatus requiring a sight opening. The invention is also useful in mounting generally circular mirrors, glasses for picture frames, port-hole glasses, circular window glasses, and the like.

In the measuring instrument and the horology art, it has been common practice to mount the mechanism in a casing having an open face which receives a dial, such open face being closed by means of a disc formed of glass or other transparent material. In its most common form, the glass plate is of the same diameter as the exterior of the casing, and it is held in place by means of a flanged ring which is force-fitted on, or is otherwise secured to, the exterior of the casing. In mountings of this character, no means are provided for yieldingly engaging the glass to prevent vibration thereof. Also, the retaining ring frequently becomes rusted and is removed only with difficulty when a new glass must be inserted.

The principal object of the present invention is the provision of novel means for mounting the disc wherein the retaining ring always exerts a yielding pressure on the glass, the pressure being sufficient to prevent vibration of the glass relative to the casing, while, at the same time, not pressing so tightly as to cause breakage if there are irregularities in the supporting seat.

Another object of the present invention is the provision of improved means of the character described which will permit the ring to be readily removed when a glass becomes broken and permit the ring to be replaced instantaneously once the new glass has been inserted in the annular seat at the front of the casing.

Inasmuch as many measuring instruments are subjected to considerable vibration which causes repeated breaking of the glass, various means have been proposed to cause some spring-pressed element to yieldingly engage the glass to prevent this vibration relative to the casing. One such means comprises a casing formed with an annular seat adjacent to, but spaced from, its forward marginal edge. A gasket of springy metal is placed upon such seat, but before it is so placed it is slightly deformed at a plurality of points throughout its length, thus presenting a wavy surface instead of a substantially flat one. The glass is placed upon this gasket or ring which engages the glass at a plurality of points rather than presenting a flat surface therefor. The casing is further provided with an annular recess just in advance of the seat, which recess receives a flat ring formed either of flat material or of springy wire. The relation of the recess to the forward surface of the glass is such as to cause the outer ring to force the glass rearwardly into yielding engagement with the inner or deformed ring, thus, in effect, compressing the glass between such annular rings. This construction is expensive, however, since it requires considerable machining of the casing and the provision of two rings.

In accordance with the present invention, the casing is formed with an annular seat adjacent to, but spaced from, the forward or open end thereof, such seat being formed by spinning the metal inwardly, or, in the case of a cast casing, by cutting an annular seat, or even by inserting a separate annular seat. The glass is placed directly upon this annular seat, or a washer interposed therebetween, and the improved and novel split-ring element of the present invention then inserted. This ring is preferably made from flat springy metal and is an oversized ring, that is to say, when the ring is lying flat with no tension thereon, the diameter of the ring is considerably in excess of the diameter of the glass, and the terminals of the split ring are separated. When, however, the terminals are brought together, the ring assumes a substantially dished contour. In other words, the ring under tension is generally frustro-conical in shape.

Although the ring not under tension is flat, or substantially so, when the terminals are brought together the entire ring is under strain and the ring assumes a non-parallel relation to the general plane of such ring. The terminals are brought to slightly overlapping position before the ring is inserted within the forward end of the casing, which forward end is inwardly turned or curled to provide an annular recess for the reception of the split ring. Thus, when the manual tension is relieved, the ring springs outwardly into engagement with the annular wall of the casing and this frustro-conical shape persists, thus causing one annular edge of the split ring to yieldingly engage the glass. The split terminals of the ring, which are desirably slightly separated when in glass-supporting relationship, are either provided with inwardly turned ends, or, in some cases, with small apertures to facilitate removal thereof. The ring in each instance is sufficiently oversized to be constantly under tension, and accordingly, the ring never takes a "set," but, on the contrary, constantly engages the glass.

In the drawing:

Fig. 1 is a side elevation, partially in section, of one embodiment of the present invention.

Fig. 2 is a front elevation thereof.

Fig. 3 is a broken section showing a slightly modified form of construction.

Figs. 4, 5 and 6 are sections showing additional modifications.

Fig. 7 is a front elevation of the oversized split, retaining ring.

Fig. 8 is a section taken on line 8—8 of Fig. 7.

Fig. 9 is a front elevation of the split ring when the terminals thereof are in meeting engagement.

Fig. 10 is a section taken on line 10—10 of Fig. 9.

Fig. 11 is a broken front elevation of a retaining ring of the present invention and showing alternative means for removing the ring from its seat.

The instrument case may either be cast, spun from flat sheet metal, or may be otherwise appropriately formed. The case 10 illustrated in Figs. 1 and 2 is formed from sheet metal and includes a closed rear wall 11 and a peripheral side wall 12. Adjacent to, but spaced from, the front marginal edge of the casing an annular seat 13 is appropriately formed by spinning or by any other means known in the art. This provides a seat for the glass 14. The outer marginal edge of the casing is inwardly turned, as shown at 15, and it will be noted that the diameter of the opening formed by the marginal edge 16 is a bit larger than the diameter of the glass 14. In other words, the glass must be slightly smaller than the maximum inner diameter of the casing in order that it may pass the inturned edge 16. In order to prevent free play of the glass, the outer surface 18 of the flange 13 which forms the seat lies at an angle to the plane of the glass, and according the glass will conveniently seat itself in the center of the annular flange or seat.

The novel locking ring 20 of the present invention is shown in some detail in Figs. 7-10, inclusive. This ring is preferably formed from flat sheet metal, such as brass, steel, iron, or any other suitable alloy. As compared with the diameter of the peripheral portion 12 of the casing, the ring is oversized and its terminal portions 21 normally are separated, as shown in Fig. 7. When, however, the terminals 21 are brought to meeting position, as shown in Fig. 9, the ring should be of slightly less diameter than the inner diameter of the casing. This ring may, of course, be stamped or otherwise cut from flat sheet metal, although for sake of economy it is preferably formed from a flat strip of metal of the width shown in Fig. 7 which is suitably bent to assume the circular configuration shown. When in this normal position the ring should be flat, as shown in Fig. 8.

In order to assist the removal of the ring when a new glass is to be placed in the casing, the terminals 21 may be provided with inturned ears 22, or they may be provided with small openings 23, as shown in Fig. 11, which receive a suitable pointed instrument. The ring is in a position of rest in Fig. 7, and when the terminals are drawn together, as shown in Fig. 9, the ring assumes the configuration shown in Fig. 10. This is due to the fact that the outer marginal edge of the ring is under tension and the inner marginal edge is under compression.

When the ring is to be placed in assembled relationship, the glass 14 is first inserted in the forward end of the casing to the position it occupies in Fig. 1. The terminals 21 of the ring are now drawn to slightly overlapping relationship and the ring inserted in the area between the glass and the inner marginal edge of the inturned flange 15. The terminals are now freed, thus permitting such terminals to move outwardly to the position they occupy in Fig. 2. In such position the inner marginal edge 24 of the ring exerts a pressure to the left when in the position shown in Fig. 10, and the outer marginal edge 25 exerts pressure to the right, thus forcing the glass away from curled edge 16 into engagement with internal annular flange 13.

In the modified construction shown in Fig. 3, the casing is formed with the annular side walls 12 and the inwardly disposed, annular flange 13 providing a seat 18 similar to that shown in Fig. 1. In this instance, however, the outer marginal edge 26 of the casing is not curled inwardly, but rather is turned to assume a contour at right angles to the side walls 12. In this instance, again, the inner diameter of the opening 27 is only slightly larger than the diameter of the glass 14, and the locking ring 20 is inserted as in the first embodiment of the invention.

The construction shown in Fig. 4 embodies a cast casing 30 having an annular recess 31 adjacent to its forward edge, the inner wall 32 of the recess being non-parallel with the glass 33, and in this instance, again, the glass seats itself in the center of the annular seat. A flange 34 is formed at the forward edge of the casing and the ring 20 is positioned between the flange 34 and the glass 33.

In the construction shown in Fig. 5, the glass 38 is inserted from the inner end of the casing 39, the inner diameter of such casing being slightly larger than the diameter of the glass. The glass is seated against the flange 40 and a recess 41 is provided just to the rear of the flange. In this instance, the ring 20 exerts an outward thrust on the glass.

The construction shown in Fig. 6 also includes a casing 43 of greater thickness than the casing shown in the first embodiment, the outer edge of the casing including a flange 44, a recess 45, and a seat 46 for the glass 47. In this instance, the glass is only slightly smaller than the recess 45 which forms the seat 46. In other words, the seat 46 may be substantially parallel with the glass rather than of tapered construction, as shown in Fig. 4. The ring 20 functions as in the other embodiments of the invention, except that shown in Fig. 5.

The foregoing description and drawing illustrates only a few of the possible uses of the retaining and mounting means of the present invention. It will be appreciated, however, that the invention is by no means limited to the uses illustrated, but will have a wide variety of uses in many fields wherein it is desirable to mount some circular element in a recessed support and at the same time have means for quickly removing the element and inserting a new one in its place.

What I claim is:

A casing of the class described comprising a tapered, annular seat adjacent to the forward end of the casing, a face of substantially transparent material received on such seat, an inturned, annular flange at the forward end of the casing, and a split retaining ring positioned between the face and the inturned flange, yieldingly urging the face into engagement with its tapered seat, the taper affording centering means for the face while yieldingly supported on such seat, said ring being formed of resilient material and normally substantially flat with an outer marginal edge which is of greater diameter than the internal diameter of the casing between the seat and the flange when such ring is lying substantially flat and not under tension, the terminals of such ring being spaced from each other when the ring is in this latter position, the ring assuming a substantially frustro-conical shape when the terminals are brought to substantially meeting engagement and the ring inserted within the casing under tension, the substantially flat, inner surface of the ring then lying at an angle to the surface of the face, the inner marginal edge of the ring engaging the face, and the outer peripheral edge engaging the casing adjacent to the flange.

RICHARD I. N. WEINGART.